(12) United States Patent
Ejzak (10) Patent No.: US 7,885,234 B2
(45) Date of Patent: Feb. 8, 2011

(54) METHOD AND SYSTEM FOR PROVIDING VOICE CALL CONTINUITY

(75) Inventor: Richard P. Ejzak, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 640 days.

(21) Appl. No.: 11/872,923

(22) Filed: Oct. 16, 2007

(65) Prior Publication Data
US 2009/0086674 A1 Apr. 2, 2009

Related U.S. Application Data

(60) Provisional application No. 60/976,658, filed on Oct. 1, 2007.

(51) Int. Cl.
*H04Q 7/00* (2006.01)
(52) U.S. Cl. .................................. 370/331; 455/436
(58) Field of Classification Search ......... 370/331–334, 370/352–356; 455/436–444
See application file for complete search history.

(56) References Cited

U.S. PATENT DOCUMENTS

2004/0176135 A1* 9/2004 Palkisto ................... 455/422.1

2007/0076608 A1* 4/2007 Samuel et al. ............. 370/252

OTHER PUBLICATIONS

Ericsson, "Drivers for Inter-RAT Radio Resource Management", 3GPP TSG-RAN WG2, R2-071351, No. St. Julian; 20070326, Mar. 20, 2007, p. 1-4.
ETSI Standards, Universal Mobile Telecommunications System (UMTS); UTRAN functions, examples on signaling procedures (EGPP TR. 25.931 version 7.3.0 Release 7), vol. 3-R3. No. V7.3.0, Dec. 1, 2006, p. 1-126.
3GPP Standards, [Online] Jul. 2007, p. 1-211, Retrieved from the Internet: URL: http://www.3gpp.org/ftp/Specs/archive/23_series/23.882/23882-1b0.zip, paragraphs [7.19.1.7.]-[7.19.1.7.3.2.].
International Search Report, Jul. 9, 2009.

* cited by examiner

*Primary Examiner*—Ricky Ngo
*Assistant Examiner*—Pao Sinkantarakorn
(74) *Attorney, Agent, or Firm*—Fay Sharpe LLP (57) ABSTRACT

A method and system for providing circuit-switched to IP Multimedia Subsystem voice call continuity with a single radio are provided. The exemplary embodiment takes advantage of a standard RANAP signaling procedure called "directed retry" to perform a much better coordination between the change in radio mode and the transfer of the media path. With the use of "directed retry", the transfer of the media path does not begin until the handover procedure is complete, thus significantly reducing the likely amount of media disruption.

13 Claims, 6 Drawing Sheets

FIG. 1
SIMPLIFIED VCC ARCHITECTURE

FIG. 2
SR-VCC FUNCTIONAL ARCHITECTURE (VISITED NETWORK)

FIG. 3 cont.

METHOD AND SYSTEM FOR PROVIDING VOICE CALL CONTINUITY

This application claims priority from U.S. Provisional Application Ser. No. 60/976,658 filed on Oct. 1, 2007.

BACKGROUND OF THE INVENTION

This invention relates to a method and system for providing circuit-switched to IP Multimedia Subsystem voice call continuity with a single radio. While the invention is particularly directed to the art of telecommunications, and will be thus described with specific reference thereto, it will be appreciated that the invention may have usefulness in other fields and applications.

By way of background, wireless telecommunication networks, which are well known, allow mobile devices to communicate with each other and other networks, such as the Internet and the Public Switched Telephone Network (PSTN). In general, the Universal Mobile Telecommunication System (UMTS) is a third generation wireless communications system that has evolved from the Global System for Mobile communication (GSM). The UMTS is intended to provide various mobile communication services by combining a UMTS Terrestrial Radio Access Network (UTRAN) with a Circuit-Switched Core Network (CS CN) based on the GSM and a Packet-Switched Core Network (PS CN) providing General Packet Radio Service (GPRS). The specification of the UMTS is currently being developed by a standardization group called the Third Generation Partnership Project (3GPP).

The IP Multimedia Subsystem (IMS) is an architectural framework for delivering internet protocol (IP) multimedia to mobile users via any IP access network providing Packet-Switched (PS) services. It was originally designed by 3GPP, and it is part of the vision for evolving mobile networks beyond GSM. To ease the integration with the Internet, IMS generally uses IETF (i.e., Internet) protocols such as Session Initiation Protocol (SIP). According to 3GPP, IMS is intended to aid the access of multimedia and voice applications from both wireless and wireline terminals, that is, to aid a form of fixed mobile convergence. This is done by having a horizontal control layer that isolates the access network from the service layer. Services need not have their own control functions, as the control layer is a common horizontal layer.

LTE/SAE (Long Term Evolution/System Architecture Evolution) is the name given to a project within 3GPP to improve the UMTS mobile phone standard to cope with future requirements. Goals include improving efficiency, lowering costs, improving services, making use of new spectrum opportunities, and better integration with other open standards. LTE/SAE's radio access is called Evolved UMTS Terrestrial Radio Access Network (E-UTRAN) and is intended to support only packet-switched services. The LTE/SAE PS CN offers PS services via a variety of access networks, such as GSM's/UMTS's own radio network (GE-RAN, UTRAN, and E-UTRAN), WiFi and even "competing" systems such as CDMA2000 and WiMax. Users of non-UMTS radio networks would be provided with an entry-point into the IP network, with different levels of security depending on the trustworthiness of the network being used to make the connection. Users of GSM/UMTS networks would use an integrated system where all authentication at every level of the system is covered by a single system, while users accessing the UMTS network via WiMAX and other similar technologies would handle the WiMAX connection one way (for example, authenticating themselves via a MAC or ESN address) and the UMTS link-up another way.

3GPP TS 23.206 defines a feature called Voice Call Continuity (VCC) that provides the capability to transfer the path of an existing voice call between a 3GPP circuit-switched (CS) system (GSM/UMTS) and IMS via packet-switched (PS) access network, and vice versa, to enable the continuation of a voice call when only one of two types of access networks are available.

Transfer of the path from IMS to CS is realized by placing a CS call to IMS that takes over for an existing IMS call. Transfer of the path from CS to IMS is realized by placing an IMS call that takes over for an existing CS call.

Current procedures in 3GPP TS 23.206 assume that it is possible for the user equipment (UE) to transmit and receive simultaneously in both IMS via PS access and CS access while transferring the media path to minimize disruption of speech and/or other media. Without simultaneous transmit and receive capability in both IMS and CS, the media disruption may last several seconds and be unacceptably long.

Simultaneous transmit and receive capability is available with a single radio for IMS over the UMTS packet-switched (PS) domain and for CS over the UMTS circuit-switched (CS) domain. Simultaneous transmit and receive capability requires two radios for IMS over WiFi and CS over GSM or UMTS. This is an acceptable burden for dual-mode WiFi and GSM/UMTS UEs, since these radios do not share chip sets.

Simultaneous transmit and receive capability for IMS over LTE and CS over GSM or UMTS also requires two radios, but this is an unacceptable burden on these devices for reasons of cost, form factor, etc., since these radios will be available in common chip sets.

Thus, the issue is how to support voice call continuity between IMS over LTE and CS over GSM/UMTS with an acceptably short media disruption during transfer of the media path using only a single radio in the UE.

Section 7.19.1 of 3GPP TS 23.882 includes a discussion of the major options currently available. However, the underlying problem with all solutions proposed so far is that there is likely to be an unacceptable disruption in media during the transfer of the media path. Note that this disclosure only focuses on the transfer of the path of a voice call from IMS over LTE to UMTS CS (GSM/UMTS). Other solutions may apply to the transfer from CS to IMS, but they are outside the scope of this disclosure.

The ideal solution requires that sufficient information be exchanged between the UE and the network prior to transfer of the media path so that the radio switch from LTE to GSM/UMTS occurs at the same time that the media path is transferred between the networks. If either occurs significantly before the other, there will be a corresponding disruption in the media. This coordination is very difficult. Arguably, the best proposed solution to date initiates the transfer of the media path just before performing an inter-system handover procedure that results in the change of radio mode. Unfortunately, the inter-system handover procedure may take as much as a few seconds to perform in a typical network, leading to a potentially significant disruption in speech or other media.

Thus, the present invention contemplates a new and improved method (and system) that resolves the above-referenced difficulties and others.

SUMMARY OF THE INVENTION

A method and system for providing circuit-switched to IP Multimedia Subsystem voice call continuity with a single radio are provided. The exemplary embodiment takes advantage of a standard RANAP (radio access network application part, defined in 3GPP TS 25.413) signaling procedure called "directed retry" to perform a much better coordination between the change in radio mode and the transfer of the media path between the networks. With the use of "directed retry," the transfer of the media path does not begin until the handover procedure is complete, thus significantly reducing the likely amount of media disruption.

In accordance with an aspect of the present invention, a method of providing circuit-switched to IP Multimedia Subsystem (IMS) voice call continuity with a single radio (UE) is provided. The method comprises: detecting that domain transfer is required and sending this information to the UE as well as sending a relocation request to an inter-working function (IWF); sending a tunneled circuit origination request to the CS CN; receiving a CS radio access bearer (RAB) assignment request from the CS CN network; the IWF responding to the CS RAB assignment request with "directed retry" to indicate that it will honor the request by initiating a CS RAB handover to a target radio access network (RAN); and completing the CS RAB handover by directing the UE to the target RAN.

In accordance with another aspect of the present invention, a method of providing circuit-switched to IP Multimedia Subsystem (IMS) voice call continuity with a single radio is provided. The method comprises: receiving a circuit-switched radio access bearer (CS RAB) assignment request and an inter-working function (IWF) responding to the CS RAB assignment request with "directed retry" to indicate that it will honor the request by initiating a CS RAB handover to a target RAN.

In accordance with yet another aspect of the present invention, a system for providing circuit-switched (CS) to IP Multimedia Subsystem (IMS) voice call continuity with a single radio (UE) is provided. The system comprises: tunneling means for tunneling CS call control and mobility management messages via a packet-switched core network (PS CN) to a circuit-switched core network (CS CN); detecting means for detecting that domain transfer is required and sending this information to the UE as well as sending a relocation request to an inter-working function (IWF); sending means for sending a tunneled circuit origination request to the CS CN; receiving means for receiving a CS (radio access bearer) RAB assignment request from the CS CN network; an inter-working function (IWF) for responding to the CS RAB assignment request with "directed retry" to indicate that it will honor the request by initiating a CS RAB handover to a target radio access network (RAN); and directing means for completing the CS RAB handover by directing the UE to the target RAN.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
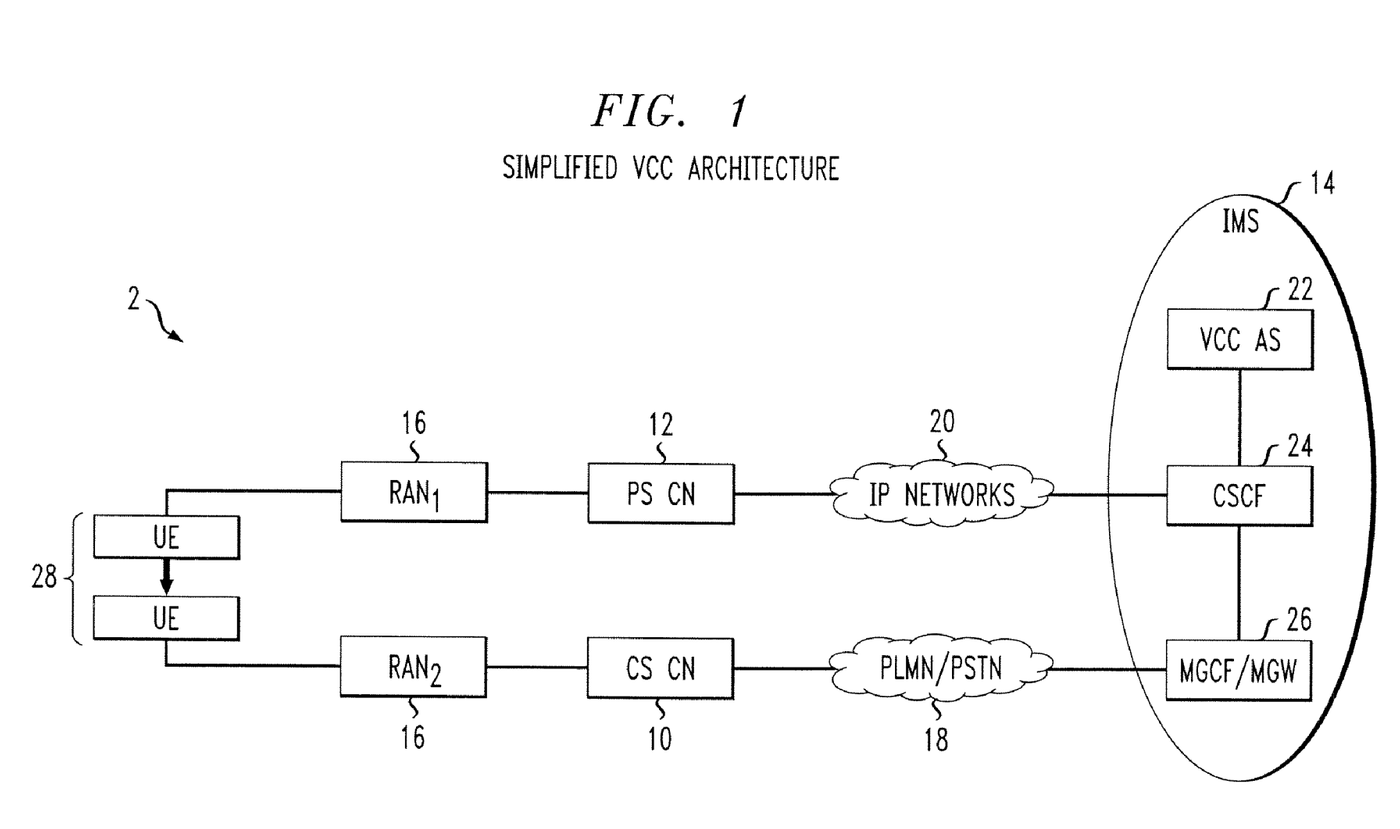
FIG. 1 is a block diagram of the VCC reference architecture.

Referring now to the drawings wherein the showings are for purposes of illustrating the exemplary embodiments only and not for purposes of limiting the claimed subject matter, FIG. 1 provides a simplified view of the VCC architecture as generally described in the 3GPP specifications and others into which the presently described embodiments may be incorporated. FIG. 1 only shows network elements and interfaces relevant to the procedures in the disclosure. In the drawings, like reference numerals have been used throughout to designate identical elements.

Before describing the basic elements shown in FIG. 1, it may be helpful to define the logical structure of the system 2. That is, the system 2 is logically divided into Core Network (CN) and Access Network (AN) infrastructures, as defined in 3GPP TS 23.101 and 3GPP TS 23.110. The CN is logically divided into a CS domain 10, a PS domain 12 and an IMS 14. The AN 16 is called BSS for GSM and RNS for UMTS, as defined in the specifications.

As noted, the CN consists of a Circuit Switched (CS) domain 10 and a Packet Switched (PS) domain 12. These two domains differ by the way they support user traffic, as explained below. These two domains are overlapping, i.e., they contain some common entities.

The CS domain 10 refers to the set of all the CN entities offering "CS type of connection" for user traffic as well as all the entities supporting the related signalling on the PLMN/PSTN 18. A "CS type of connection" is a connection for which dedicated network resources are allocated at the connection establishment and released at the connection release.

The PS domain 12 refers to the set of all the CN entities offering "PS type of connection" for user traffic as well as all the entities supporting the related signalling on IP networks 20. A "PS type of connection" transports the user information using autonomous concatenation of bits called packets: each packet can be routed independently from the previous one.

The IMS 14 comprises all CN elements (e.g., VCC AS 22, CSCF 24 and MGCF/MGW 26) for provision of IP multimedia services comprising audio, video, text, chat, and a combination of them delivered over the PS domain. 3GPP TS 23.228 defines the core IMS network elements. The Call State Control Function (CSCF) 24 provides for registration of SIP user equipment (UE) and routing of all SIP requests in IMS 14. The Media Gateway Control Function (MGCF) and corresponding Media Gateway (MGW) 26 provide interworking between the SIP-based session management procedures used within IMS 14 and the protocols used within PLMN/PSTN networks 18, such as the Integrated Services Digital Network User Part (ISUP). 3GPP TS 23.206 defines the Voice Call Continuity Application Server (VCC AS) 22, which manages media sessions with dual-mode UEs to select the proper access domain over which to deliver calls, and to perform SIP Third Party Call Control (3PCC) procedures as needed to switch the media path of an ongoing call between the access domains. The VCC AS performs the 3PCC procedures to realize the domain transfer upon receipt of a call from the UE 28 via the target access domain.

The system 2 generally includes dual-mode VCC-capable User Equipment (VCC UE) 28, which supports voice and possibly other media over both IMS and CS domains. The UE 28 may be located anywhere within the coverage area of the RAN 16, and it may be stationary or mobile. The UE 28 may also be referred to as a mobile station, a terminal, an access terminal, a subscriber unit, a station, etc. In this regard, the UE 28 may be a cellular phone, a personal digital assistant (PDA), a wireless device, a handheld device, a wireless modem, a laptop computer, etc. The UE 28 may communicate with one or more NodeBs in either RAN 16 on the downlink and/or uplink at any given moment.

Figure 2:
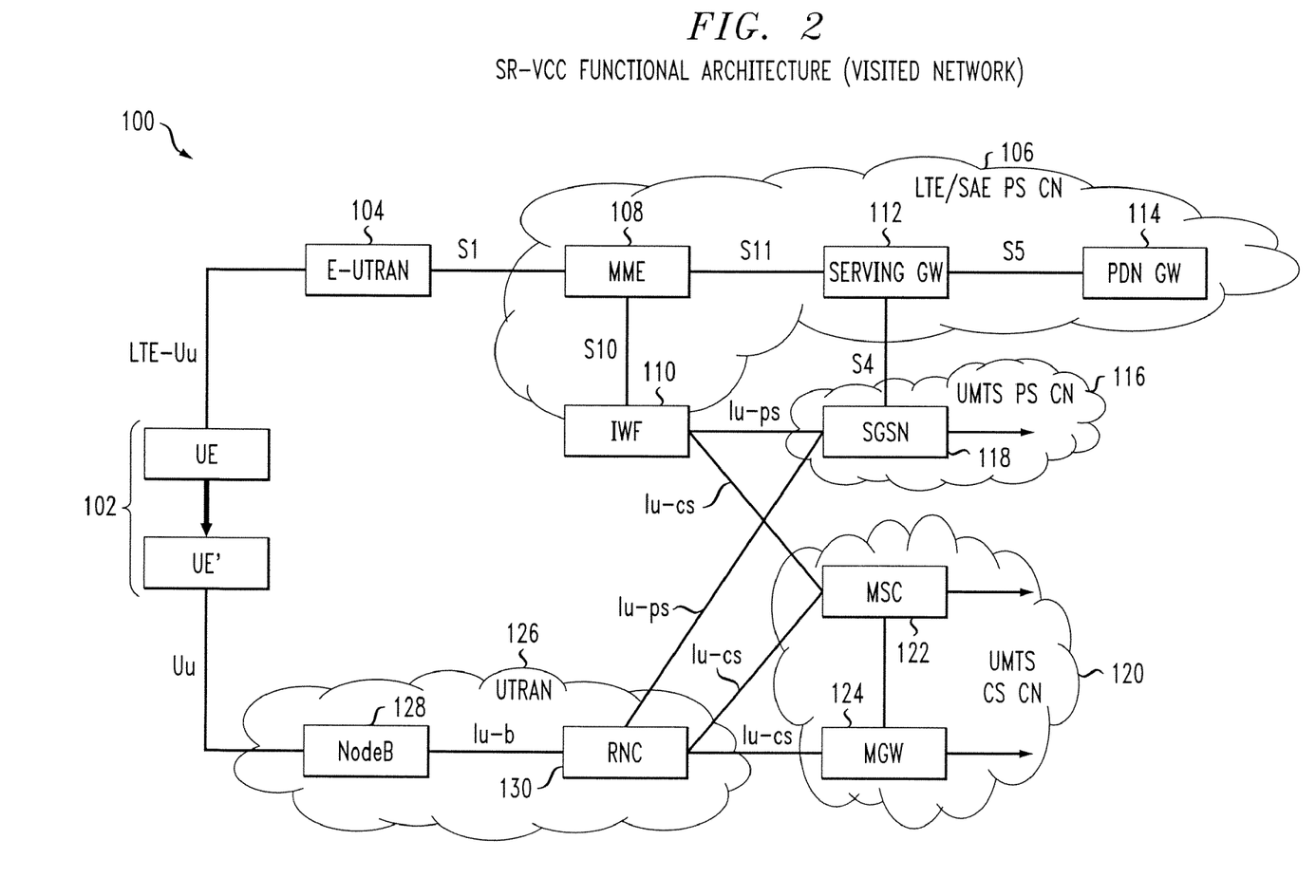
FIG. 2 is a block diagram of an exemplary communications system suitable for implementing aspects of the present invention.

FIG. 2 shows a block diagram of a communication system 100 suitable for providing circuit-switched to IMS voice call continuity with a single radio. Only key network elements and interfaces are shown.

The system 100 generally includes a VCC UE 102 and an E-UTRAN 104. The system requirements for the E-UTRAN 104 are described, for example, in 3GPP TR 25.913, which is incorporated herein by reference.

The LTE/SAE PS CN 106 includes an MME (Mobility Management Entity) 108, an IWF (Inter-Working Function) 110, a serving GW (Gateway) 112, and a PDN GW (Packet Data Network Gateway) 114.

The MME 108 manages and stores UE context. It generates temporary identities and allocates them to UEs and checks the authorization as to whether the UE may camp on the LTE radio or on the PLMN. It also authenticates the user.

The serving GW 112 routes and forwards user data packets, while also acting as the mobility anchor for the user plane during inter-eNodeB handovers and as the anchor for mobility between LTE and other 3GPP technologies. It manages and stores UE contexts, for example, parameters of the IP bearer service and network internal routing information.

The PDN GW 114 provides PS connectivity between the UE 102 and external packet data networks by being the point of exit and entry of traffic for the UE 102. The UE 102 may have simultaneous connectivity with more than one PDN GW 114 for accessing multiple PDNs. Another key role of the PDN GW 114 is to act as the anchor for mobility between 3GPP and non-3GPP technologies such as WiMAX and 3GPP2 (CDMA 1X and EvDO).

The IWF 110 is a new network element that helps to enable the invention; it is described later.

The UMTS PS CN 116 includes an SGSN (Serving GPRS Support Node) 118 and other entities such as the GGSN (Gateway GPRS Support Node), not shown. The SGSN 118 in the UMTS PS CN 116 is analogous to the Serving GW 112 in the LTE/SAE PS CN 106. The SGSN 118 routes and forwards user data packets, while acting as the mobility anchor for mobility between RNCs 130.

The UMTS CS CN 120 includes an MSC (Mobile Switching Center) 122 and an MGW 124. The MSC 122 constitutes the interface between the radio system and the fixed networks. The MSC 122 performs all necessary functions in order to handle the circuit switched services to and from the mobile stations. The MGW 124 adapts between CS radio access bearers (RAB) in the UTRAN/GERAN 126 and bearer channels in the PLMN/PSTN 18.

The UTRAN 126 includes a number of NodeBs 128, each serving the communication needs of the UE 102 in a respective coverage area. The NodeBs 128 are connected to a radio network controller (RNC) 130. A NodeB is generally a fixed station that communicates with the UE 102 and may also be referred to as an enhanced NodeB, a base station, an access point, etc.

The RNC 130 is connected to an SGSN 118 in the UMTS PS CN 116 and to an MSC 122 in the UMTS CS CN 120, and provides coordination and control for the NodeBs 128 along with management of the PS RABs and CS RABs allocated for each UE 102.

The main functions of several known reference points (i.e., a conceptual point at the conjunction of two non overlapping functional entities or groups) as shown in FIG. 2 are set forth below:

S1: It provides access to E-UTRAN resources for the transport of user plane and control plane traffic.

S4: It provides the user plane with related control and mobility support between the UMTS PS CN 116 and the Serving GW 112 and is based on Gn reference point as defined between SGSN and GGSN.

S5: It provides the user plane with related control and mobility support between the PDN GW 114 and the Serving GW 112.

S10: It provides the user plane with related control and mobility support between the MMEs 108. Note that the IWF 110 interacts with MME 108 by emulating another MME 108

S11: It provides the user plane with related control and mobility support between the MME 108 and the Serving GW 112.

Iu-ps: It provides the user plane with related control and mobility support between the RNC 130 and the SGSN 118 for management of PS RABs.

Iu-cs: It provides the user plane with related control and mobility support between the RNC 130 and the MSC 122 for tunneling of CS call control messages and management of CS RABs.

FIG. 2 also shows several known interfaces (i.e., a set of technical characteristics describing the point of connection between two telecommunication entities), including Iu-b Interface, Uu Interface, and LTE-Uu Interface. The darker lines represent the user plane (e.g., voice, packet), while the thinner lines represent the control plane (e.g., SIP, RANAP).

In addition to the standard elements already described in FIG. 2, this invention introduces a new element IWF 110 with unique functions needed to coordinate the domain transfer signaling between the LTE/SAE PS CN 106 and the UMTS CS CN 120. On the side toward the MME 108, the IWF 110 emulates a peer MME entity in the LTE/SAE network via the standard S10 interface. On the side toward the UMTS network, the IWF 110 emulates a UMTS RAN 130 via the Iu-cs and Iu-ps interfaces to the CS CN 120 and PS CN 116, respectively, providing the functions associated with RANAP (Radio Access Network Application Part). An IWF 110 may also facilitate interworking between LTE/SAE and GSM networks via the A and Gb interfaces using BSSMAP to the GSM CS CN and GSM PS CN, respectively, (not shown), between any PS CN and any CS CN, or between any PS CN and any combination CS CN and PS CN. The IWF 110 may also be collocated with the MME 108 or other network entities while providing the same functions in the architecture.

The key RANAP functions provided by the IWF 110 are: tunneling of CS call control messages between the UE 102 and the CS CN 120; radio access bearer (RAB) assignment; and RAB relocation. In addition, the IWF 110 coordinates these procedures to realize the invention, as described in the procedures below. In support of the tunneling and relocation functions in the IWF 110, the UE 102, E-UTRAN 104 and MME 108 also provide supporting functions as described in the procedures below. In particular, E-UTRAN 104 can identify the need for a domain transfer procedure due to radio conditions and signal this towards both the UE 102 and IWF 110 with new messaging. In addition, the UE 102 has the capability to exchange CS call control messages (for example, as described in 3GPP TS 24.008) with the CS CN 120 via the CS call control tunneling capabilities of the E-UTRAN 104, MME 108 and IWF 110. Finally, the IWF 110, MME 108 and E-UTRAN 104 can forward a relocation/handover command directive to the UE 102 from the UMTS CS CN 120 and optionally from the PS CN 116, to direct the UE 102 to retune to the UMTS radio as needed to complete relocation/handover procedures.

Figure 3:
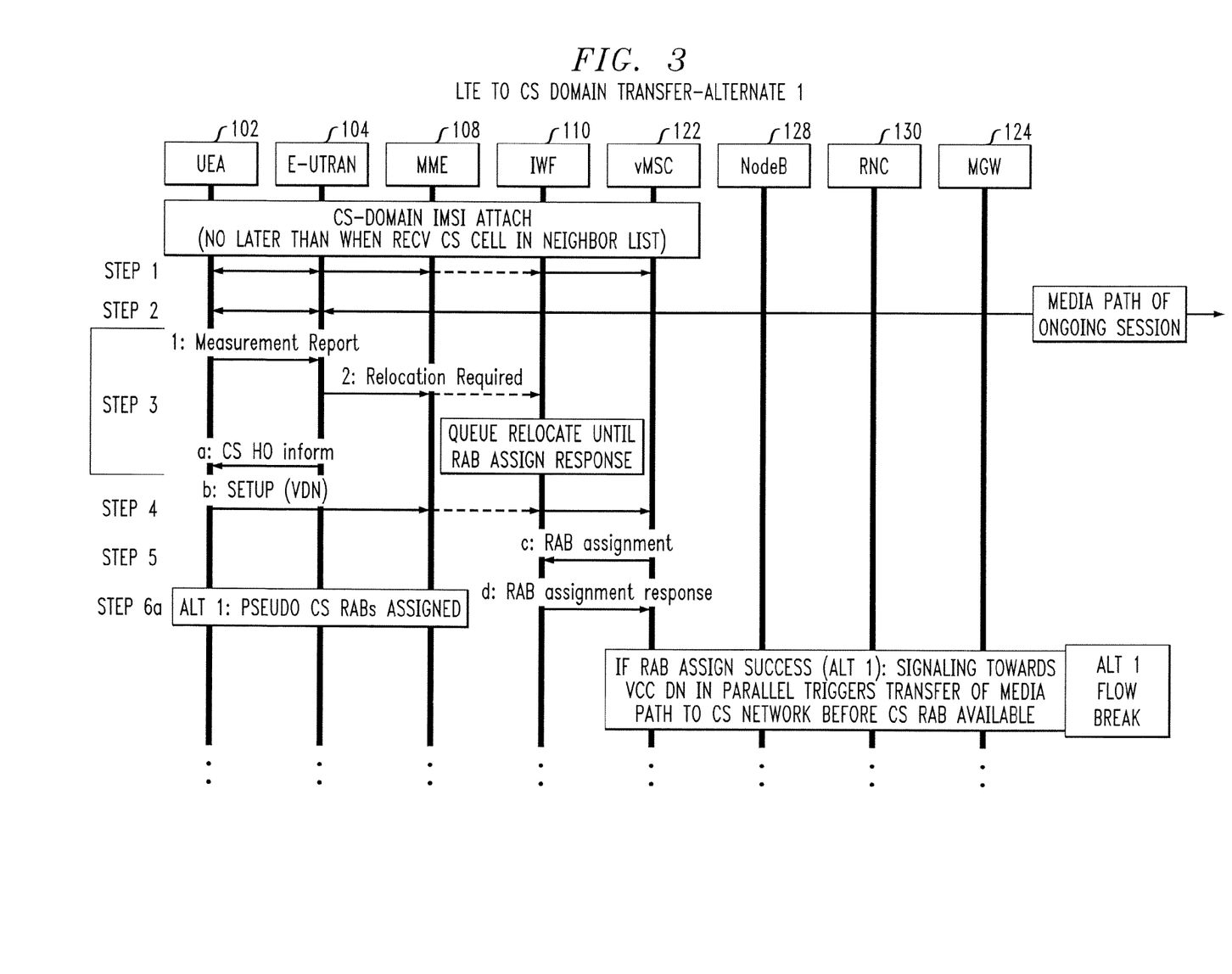
FIG. 3 is a call flow for an embodiment of a method of providing LTE to CS domain transfer.
Figure 4:
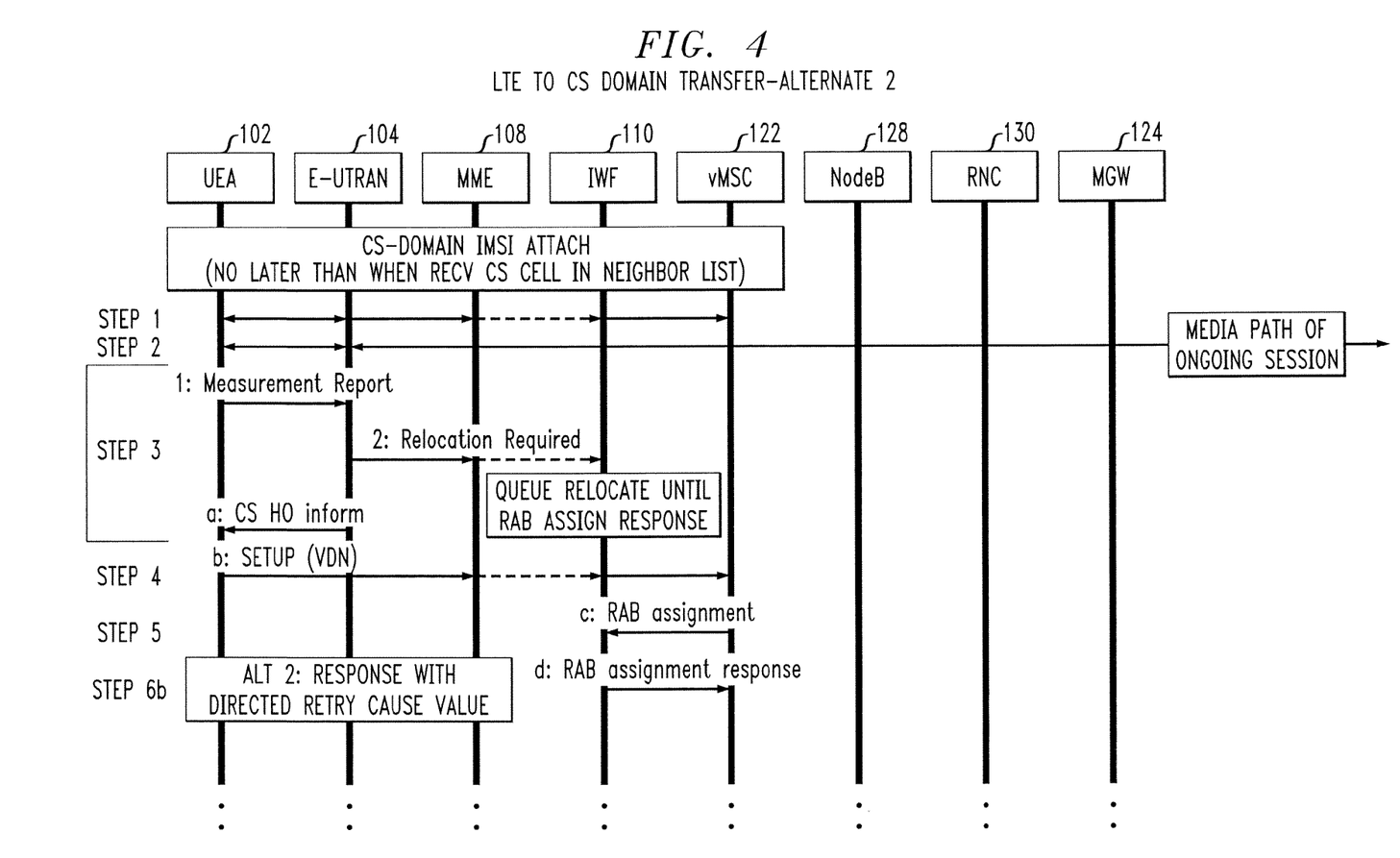
FIG. 4 is a call flow for another embodiment of a method of providing LTE to CS domain transfer.

We turn now to FIGS. 3 and 4, which show call flows for alternative embodiments of a method of providing CS-to-IMS voice call continuity with a single radio.

Step 1: Prior to the need for "domain transfer" from IMS over LTE to CS over GSM/UMTS, the LTE/SAE network 106 tunnels CS registration messages or location area update messages as needed between the UE 102 and the CS CN 120 so that the UE 102 is prepared to tunnel additional signaling when the time comes to perform the domain transfer.

Step 2: Meanwhile, the IMS session is in progress via the E-UTRAN 104 and LTE/SAE network 106.

Step 3: When the LTE RAN (E-UTRAN) 104 determines that domain transfer is needed (partly based on radio measurement reports from the UE 102), the E-UTRAN 104 signals to the UE 102 that it should initiate the domain transfer. The E-UTRAN 104 also signals to the MME 108 and IWF 110 that relocation is required in support of the domain transfer. The IWF 110 queues the relocation request until it receives a RAB assignment request from the CS CN to synchronize the CS and PS RAB relocation procedures.

Step 4: The UE 102 sends a tunneled CS origination request to the CS CN 10/120 via the LTE/SAE network 106. The purpose of the origination request is to establish a bearer path from the UE 102 to the IMS 14 via the CS RAN 126 and CS CN 10/120 to replace the still active bearer path from the UE 102 to the IMS 14 via the LTE/SAE network 12/106.

Step 5: Following the standard procedure for CS origination, the MSC 122 (in the CS CN 10/120) sends a "CS RAB assignment request" message to the IWF 110 via RANAP over Iu-CS, treating the IWF 110 like an RNC in a CS RAN. The CS RAB, when finally realized in step 7a or 7b below, will provide the portion of the media path for the call between the UE 102 and the CS CN 10/120 via the CS RAN 16/126.

Step 6a: While it is possible for the LTE/SAE network 106 to emulate a CS RAB (possibly even temporarily) before transferring it to the CS RAN, this would force at least two disruptions in the media path during the transition, which is undesirable. As shown in FIG. 3, one alternative here (i.e., Step 6a) is for the IWF 110 to signal successful completion of the CS RAB assignment without actually doing so (i.e., it lies). The CS CN 10/120 (MSC 122), having been told that the CS RAB assignment is complete, propagates the CS origination into the network, initiating the transfer of the media path from IMS over LTE to CS over GSM/UMTS. But since the real CS RAB is not yet in place, the media path is blocked.

Step 7a: The procedure continues in FIG. 3. In parallel with Step 6a, the IWF 110 initiates a handover of the (phantom) CS RAB from the E-UTRAN 104 to the CS RAN 126 via existing procedures. When the handover is complete, the UE 102 and the network re-establish the media path via the CS RAN 126 and CS CN 10/120. Unfortunately, there is a disruption of the media path that lasts approximately as long as the handover procedure, which may take an unacceptably long time.

Step 6b: As shown in FIG. 4, a better alternative to Step 6a is for the IWF 110 to signal "directed retry" in response to the CS RAB assignment request in Step 5. The "directed retry" indication informs the CS CN 10/120 that the IWF 110 (emulating a CS RAN) is incapable of assigning a CS RAB at this time (usually due to resource constraints in a CS RAN) but there is a CS RAN candidate (e.g., UTRAN 126) to fulfill the CS RAB assignment request and the IWF 110 will initiate a CS RAB handover procedure to assign this CS RAB in the CS RAN 126. The "directed retry" procedure was initially created to support "hand-down" from UMTS/UTRAN to GSM/GERAN when a UE 102 originates a call on UMTS but there are insufficient resources in UMTS/UTRAN to support the call. The CS origination is blocked until the MSC 122 receives an indication of successful CS RAB assignment, so the media path is not yet transferred but continues via E-UTRAN 104 and LTE/SAE network 106

Step 7b: The procedure continues in FIG. 4. Immediately after the IWF 110 indicates "directed retry" to the CS CN 10/120, it initiates a CS RAB handover to the CS RAN 126 via the CS CN 10/120. To complete the handover signaling, the CS CN 10/120 (MSC 122) forwards the handover request to the CS RAN 126, the CS RAN 126 assigns resources for the CS RAB and acknowledges the assignment to the CS CN 10/120, the CS CN 10/120 informs the IWF 110 of CS RAB resource assignment in the CS RAN 126, the LTE/SAE network 106 directs the UE 102 to re-tune its radio to the CS RAN 126, the CS RAN 126 detects connectivity to the UE 102, and the CS CN 10/120 propagates the CS origination into the network. The signaling of the CS origination into the network initiates the transfer of the media path from IMS over LTE to CS over GSM/UMTS and the transfer of the media path is complete. The disruption in the media path begins when the radio retunes and ends when the transfer of the media path is complete, but these steps are expected to usually take less time than the entire handover procedure.

Step 8: Note that, in parallel with Steps 6 and 7 in FIG. 3 and FIG. 4, the LTE/SAE network 106 and the IWF 110 may also relocate/handover any other PS RABs from E-UTRAN 104 to UTRAN/GERAN 126 to the extent that the target network supports these PS RABs. The PS RAB relocation/handover would occur in parallel with and synchronous with the CS RAB relocation/handover according to existing procedures.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that variants of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method of providing circuit-switched (CS) to IP Multimedia Subsystem (IMS) voice call continuity with a single radio (UE), the method comprising:
   detecting that domain transfer is required and sending this information to the UE as well as sending a relocation request to an inter-working function (IWF);
   sending a tunneled circuit origination request to the CS CN;
   receiving a CS radio access bearer (RAB) assignment request from the CS CN network;
   the IWF responding to the CS RAB assignment request with "directed retry" indication to indicate that it will honor the request by initiating a CS RAB handover to a target radio access network (RAN); and
   completing the CS RAB handover by directing the UE to the target RAN.

2. The method defined in claim 1, further comprising:
   the CS CN forwarding the handover request to the CS RAN;
   the CS RAN assigning resources for the CS RAB and acknowledging the assignment to the CS CN;
   the CS CN informing the IWF of CS RAB resource assignment in the CS RAN;
   the PS CN directing the UE to re-tune its radio to the CS RAN;
   the CS RAN detecting connectivity to the UE 102; and
   the CS CN propagating the CS origination into the network.

3. The method defined in claim 1, wherein the PS CN comprises an LTE/SAE (Long Term Evolution/System Architecture Evolution) network.

4. The method defined in claim 1, further comprising:
   transferring PS RABs from the PS CN network to the target RAN to the extent supported by the target RAN.

5. The method defined in claim 1, further comprising:
   the IWF queuing the relocation request until it receives a RAB assignment request from the CS CN to synchronize CS and PS relocation procedures.

6. The method defined in claim 1, wherein the "directed retry" indication informs the CS CN that the IWF is incapable of assigning a CS RAB at this time but there is a CS RAN candidate to fulfill the CS RAB assignment request and the IWF initiates a CS RAB handover procedure to assign this CS RAB in the CS RAN.

7. The method defined in claim 6, wherein immediately after the IWF indicates "directed retry" to the CS CN, it initiates a CS RAB handover to the CS RAN via the CS CN.

8. A system for providing circuit-switched (CS) to IP Multimedia Subsystem (IMS) voice call continuity with a single radio (UE), the system comprising:
   tunneling means for tunneling CS call control and mobility management messages via a packet-switched core network (PS CN) to a circuit-switched core network (CS CN);
   detecting means for detecting that domain transfer is required and sending this information to the UE as well as sending a relocation request to an inter-working function (IWF);
   sending means for sending a tunneled circuit origination request to the CS CN;
   receiving means for receiving a RAB assignment request from the CS CN network;
   an inter-working function (IWF) for responding to the CS RAB assignment request with "directed retry" indication to indicate that it will honor the request by initiating a CS RAB handover to a target radio access network (RAN); and
   directing means for completing the CS RAB handover by directing the UE to the target RAN.

9. The system defined in claim 8, wherein the PS CN comprises an LTE/SAE (Long Term Evolution/System Architecture Evolution) network.

10. The system defined in claim 8, further comprising:
transferring means for transferring PS RABs from the PS CN network to the target RAN to the extent supported by the target RAN.

11. The system defined in claim 8, wherein the IWF is operative to queue the relocation request until it receives a RAB assignment request from the CS CN to synchronize CS and PS relocation procedures.

12. The system defined in claim 8, wherein the "directed retry" indication informs the CS CN that the IWF is incapable of assigning a CS RAB at this time but there is a CS RAN candidate to fulfill the CS RAB assignment request and the IWF initiates a CS RAB handover procedure to assign this CS RAB in the CS RAN.

13. The system defined in claim 12, wherein the IWF is operative to initiate a CS RAB handover to the CS RAN via the CS CN immediately after the IWF indicates "directed retry" to the CS CN.

\* \* \* \* \*